US012620173B2

(12) United States Patent
Luidolt et al.

(10) Patent No.: US 12,620,173 B2
(45) Date of Patent: May 5, 2026

(54) HAND-RELATED DATA ANNOTATIONS WITH AN AUGMENTED REALITY DEVICE

(71) Applicant: Snap Inc., Santa Monica, CA (US)

(72) Inventors: Laura Rosalia Luidolt, Vienna (AT); Kai Zhou, Wiener Neudorf (AT); Adrian Schoisengeier, Vienna (AT)

(73) Assignee: Snap Inc., Santa Monica, CA (US)

( * ) Notice: Subject to any disclaimer, the term of this patent is extended or adjusted under 35 U.S.C. 154(b) by 211 days.

(21) Appl. No.: 18/234,737

(22) Filed: Aug. 16, 2023

(65) Prior Publication Data

US 2025/0061658 A1 Feb. 20, 2025

(51) Int. Cl.
| | |
|---|---|
| *G06T 19/00* | (2011.01) |
| *G06T 7/70* | (2017.01) |
| *G06T 13/40* | (2011.01) |
| *G06T 15/20* | (2011.01) |
| *G06T 17/20* | (2006.01) |
| *G06V 40/10* | (2022.01) |

(52) U.S. Cl.
CPC ............... *G06T 17/20* (2013.01); *G06T 7/70* (2017.01); *G06T 13/40* (2013.01); *G06T 15/20* (2013.01); *G06T 19/006* (2013.01); *G06V 40/11* (2022.01); *G06T 2207/20081* (2013.01); *G06T 2207/30196* (2013.01)

(58) Field of Classification Search
CPC ........ G06T 13/40; G06V 40/11; G06V 40/113
See application file for complete search history.

(56) References Cited

U.S. PATENT DOCUMENTS

| | | | |
|---|---|---|---|
| 2010/0106475 A1* | 4/2010 | Smith | ................... G16H 50/50 703/11 |
| 2016/0162673 A1 | 6/2016 | Kutliroff et al. | |
| 2022/0198747 A1 | 6/2022 | Savaroche | |

(Continued)

OTHER PUBLICATIONS

Qian, Xun, et al. "Arnnotate: An augmented reality interface for collecting custom dataset of 3d hand-object interaction pose estimation." Proceedings of the 35th Annual ACM Symposium on User Interface Software and Technology. 2022. (Year: 2022).*

(Continued)

*Primary Examiner* — Ryan Mcculley
(74) *Attorney, Agent, or Firm* — Schwegman Lundberg & Woessner, P.A.

(57) ABSTRACT

An augmented reality (AR) device generates hand annotations for an image depicting a user's hand. The device includes a display, a processor, and a memory storing instructions for performing operations. The device performs a calibration operation to generate a 3-D model of the user's hand based on measurements. The calibration operation prompts the user to mimic the hand gesture presented by the animated virtual representation of a hand to obtain optimal images of the hand for hand pose estimation. A 3-D virtual representation of a hand in a hand pose corresponding with a hand gesture is generated based on the 3-D model. The device presents the 3-D virtual representation of the hand in AR via the display. During presentation, the device detects an input and captures an image of the user's hand positioned to correspond with the 3-D virtual representation. The captured image is stored with corresponding hand annotations based on the 3-D model.

19 Claims, 8 Drawing Sheets

(56) References Cited

U.S. PATENT DOCUMENTS

2023/0079335 A1    3/2023  Sawhney et al.
2023/0214458 A1 *  7/2023  Marsden ................ G06V 40/28
                                               382/157
2024/0118786 A1 *  4/2024  Ramani ................... G06F 3/011

OTHER PUBLICATIONS

Ohkawa, Takehiko, Ryosuke Furuta, and Yoichi Sato. "Efficient annotation and learning for 3d hand pose estimation: A survey." International Journal of Computer Vision 131.12 (2023): 3193-3206. (Year: 2023).*

"International Application Serial No. PCT/US2024/042066, International Search Report mailed Nov. 26, 2024", 4 pgs.

"International Application Serial No. PCT/US2024/042066, Written Opinion mailed Nov. 26, 2024", 10 pgs.

* cited by examiner

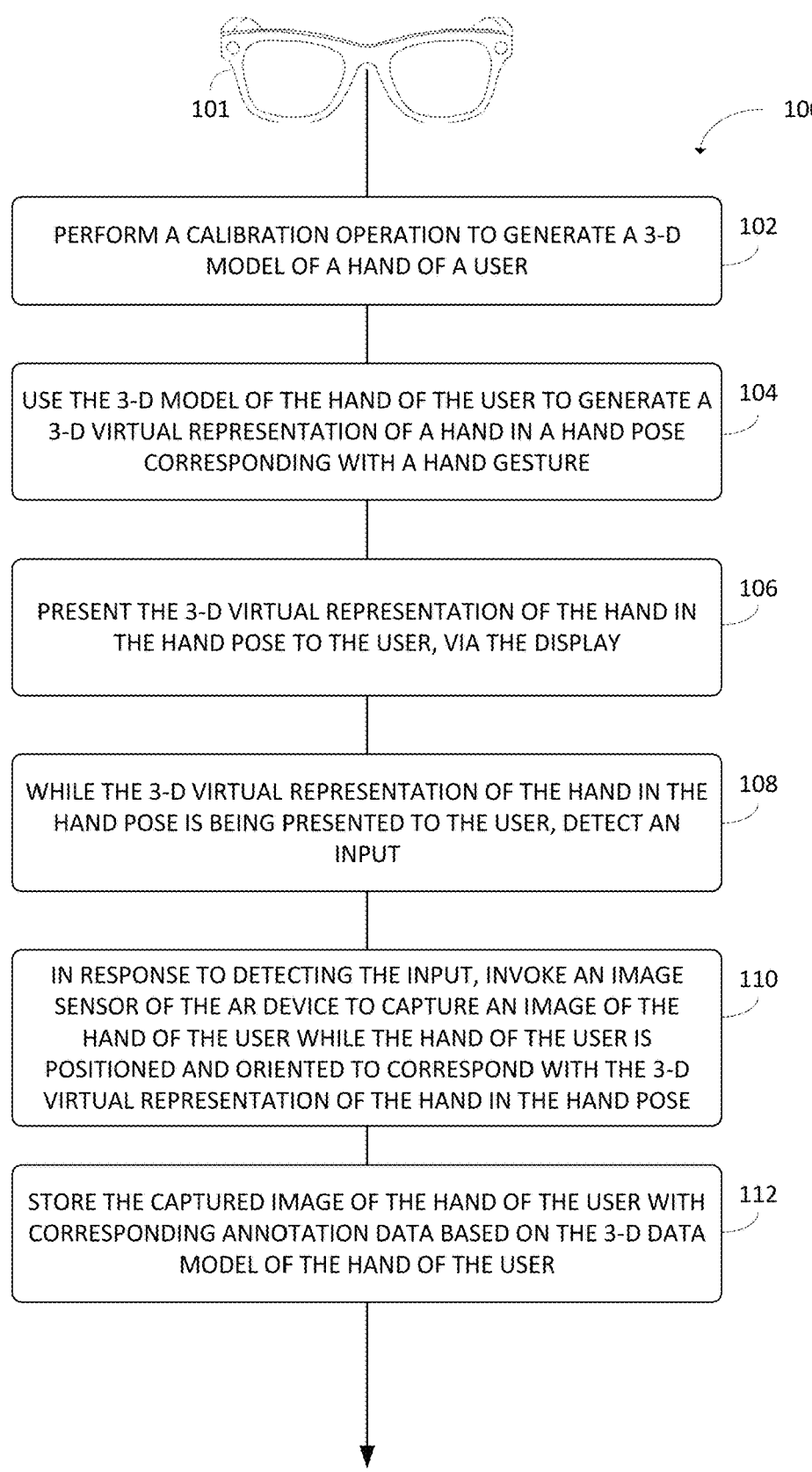

101

100

PERFORM A CALIBRATION OPERATION TO GENERATE A 3-D MODEL OF A HAND OF A USER

102

USE THE 3-D MODEL OF THE HAND OF THE USER TO GENERATE A 3-D VIRTUAL REPRESENTATION OF A HAND IN A HAND POSE CORRESPONDING WITH A HAND GESTURE

104

PRESENT THE 3-D VIRTUAL REPRESENTATION OF THE HAND IN THE HAND POSE TO THE USER, VIA THE DISPLAY

106

WHILE THE 3-D VIRTUAL REPRESENTATION OF THE HAND IN THE HAND POSE IS BEING PRESENTED TO THE USER, DETECT AN INPUT

108

IN RESPONSE TO DETECTING THE INPUT, INVOKE AN IMAGE SENSOR OF THE AR DEVICE TO CAPTURE AN IMAGE OF THE HAND OF THE USER WHILE THE HAND OF THE USER IS POSITIONED AND ORIENTED TO CORRESPOND WITH THE 3-D VIRTUAL REPRESENTATION OF THE HAND IN THE HAND POSE

110

STORE THE CAPTURED IMAGE OF THE HAND OF THE USER WITH CORRESPONDING ANNOTATION DATA BASED ON THE 3-D DATA MODEL OF THE HAND OF THE USER

3-D VIRTUAL REPRESENTATION OF A HAND IN A HAND POSE, CORRESPONDING WITH A HAND GESTURE

101

HAND-RELATED DATA ANNOTATIONS WITH AN AUGMENTED REALITY DEVICE

TECHNICAL FIELD

The present application relates to the field of computer vision systems. More specifically, the subject matter of the present application relates to an automated technique for generating hand-related data annotations for images depicting various hand poses.

BACKGROUND

Hand-related data annotations, sometimes referred to more simply as hand annotations, play a crucial role in computer vision systems, augmented reality (AR), and gesture recognition systems. These systems rely on accurate and detailed information about hand poses, hand movements, and hand gestures to provide immersive user experiences, enable natural user interfaces, and enhance human-computer interaction. Hand annotations are used as training data to train machine learning algorithms, enabling these systems to understand and interpret hand-related information in real-time.

Generating hand annotations involves identifying and labeling landmarks, specific points or marks on a hand (e.g., an image of a hand), in order to provide detailed information about its pose, movements, or other characteristics. In a hand model, the number of points or marks used can vary depending on the level of detail required and the specific application. However, a common approach is to use a set of key landmark points that capture the essential features and articulations of the hand. These landmark points typically include:

Fingertips: Points located at the tips of each finger, representing the positions of the fingertips.

Finger Joints: Points along the length of each finger, representing the joint positions, such as the metacarpophalangeal (MCP), proximal interphalangeal (PIP), and distal interphalangeal (DIP) joints.

Knuckles: Points located at the joints where the fingers meet the hand, capturing the positions of the knuckles.

Palm Center: A point at the center of the palm, representing the overall position of the hand.

Wrist: A point at the base of the hand, indicating the position of the wrist.

Each point or mark in the hand model is associated with specific information that helps describe the hand's pose or movements. This information typically includes three-dimensional (3-D) positional data or coordinates (e.g., X, Y and Z coordinates) of each point or mark in a 3-D space, defining the position of the point or mark relative to a reference point. These hand annotations, which collectively represent a 3-D model of a hand, provide valuable data for various applications. For instance, in hand gesture recognition, the positions of the fingertips and other landmark points can be used to classify and interpret different gestures. In AR, the hand annotations help track and overlay virtual objects onto the user's hand accurately. By obtaining images with hand-related data annotations for specific points or marks, it becomes possible to analyze and understand the intricacies of hand poses, and thus hand movements and hand gestures, enabling a wide range of applications that rely on accurate hand tracking and interpretation.

BRIEF DESCRIPTION OF THE DRAWINGS

In the drawings, which are not necessarily drawn to scale, like numerals may describe similar components in different views. To easily identify the discussion of any particular element or operation, the most significant digit or digits in a reference number refer to the figure number in which that element is first introduced. Some non-limiting examples are illustrated in the figures of the accompanying drawings in which:

FIG. 1 is a flow diagram illustrating an example of method operations involved in a technique for using an augmented reality (AR) device, such as AR glasses, to generate images of a hand in a hand pose, where each image is associated with corresponding hand-related data annotations, consistent with some examples.

DETAILED DESCRIPTION

Figure 2:
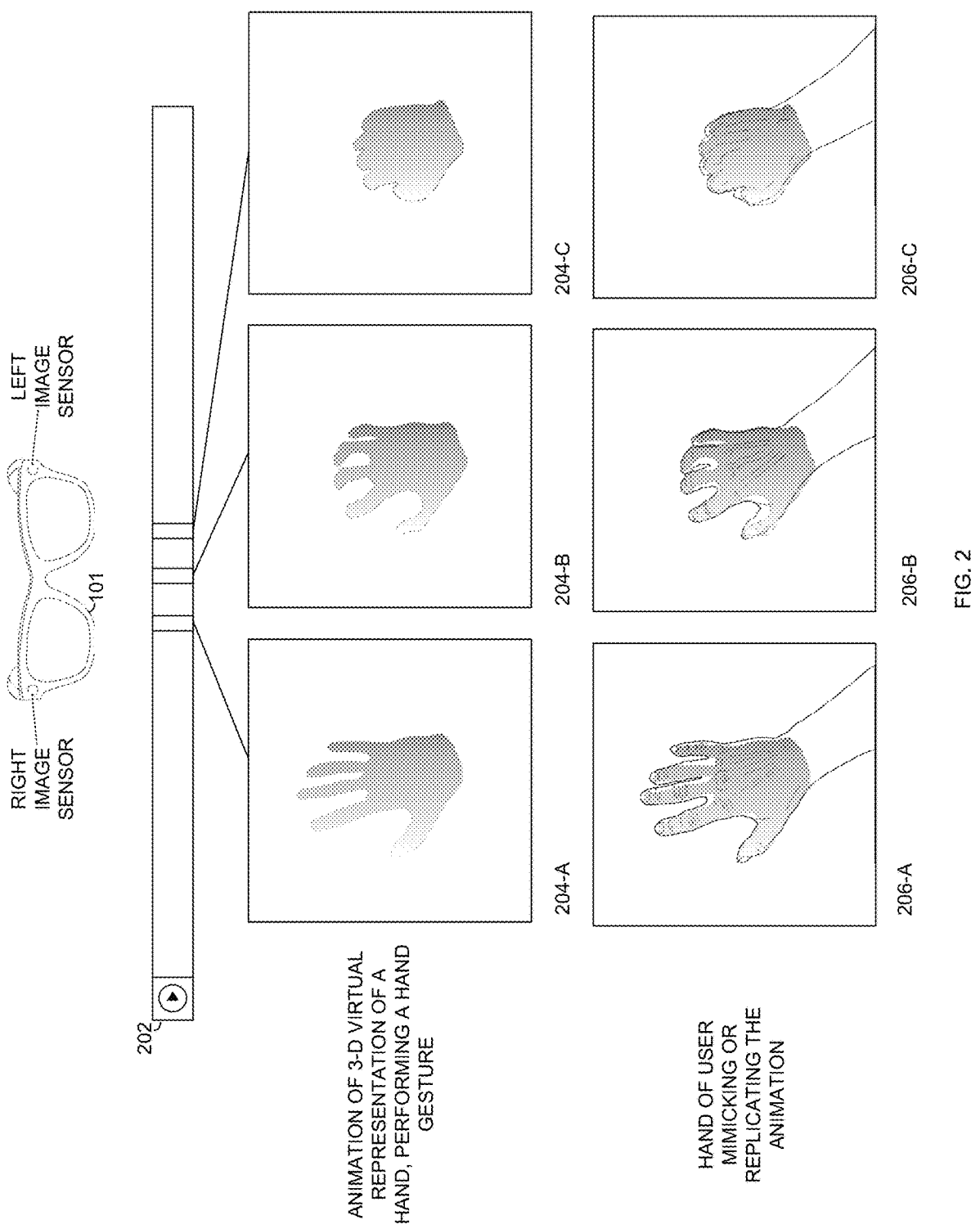
FIG. 2 is a diagram illustrating an example of a calibration operation, during which a user is prompted to position and move his or her hand to replicate a hand gesture that is presented via an animation of a 3-D virtual representation of a hand performing the gesture, in AR, according to some examples.

Described herein are methods, systems, and computer program products, for using a wearable augmented reality (AR) device, such as an AR headset or AR glasses, to generate images depicting hands in various hand poses that are associated with hand gestures, where each image is associated with hand-related data annotations. Accordingly, each instance of a combination of an image and its associated hand-related data annotations may be used as an instance of training data in training a machine learning algorithm. In the following description, for purposes of explanation, numerous specific details are set forth to provide a thorough understanding of the various aspects of different embodiments of the present invention. It will be evident, however, to one skilled in the art, that the present invention may be practiced without all of these specific details.

In the field of AR, hand-related data annotations refer to the process of labeling and annotating visual information related to hands and their movements. Typically, this involves manually attaching metadata to images or frames (e.g., individual images in a sequence of images comprising a video) that capture hand poses, hand gestures, or other hand-related information. The metadata comprises positional data for each of several landmarks associated with a particular hand model. Each point or mark represents the positional data in three dimensions of a specific part of a hand (e.g., a fingertip, a joint, a knuckle, or the end of a bone). These hand annotations serve as a bridge between the physical hand movements and the digital AR environment, enabling accurate tracking and interaction.

Hand-related data annotations are of paramount importance in the context of AR for several reasons. Firstly, hand annotations serve as training data that enables the training of computer vision algorithms to perform precise hand tracking, allowing AR systems to recognize and follow the position, orientation, and movements of a user's hands in real-time. The accuracy of the positional data for each marker is crucial for creating a seamless and immersive user experience, where virtual objects can be interacted with and manipulated in a natural and intuitive manner.

Furthermore, the hand annotations can be used to train computer vision algorithms that facilitate gesture recognition in AR applications. By associating specific hand gestures or movements with predefined commands or actions, an AR device can interpret and respond to the user's intentions. This opens up a wide range of possibilities, including virtual object manipulation, menu navigation, virtual sculpting, and much more, enhancing the usability and functionality of AR applications and experiences.

One conventional technique for generating hand annotations is to capture images of a person making various hand poses associated with specific hand gestures. Then, a human expert manually analyzes the images to identify in each image of a hand specific landmarks. This manual method involves a time and labor-intensive process wherein the expert is required to identify and label the relevant points on each image of a hand. This task can be arduous and time-consuming due to the intricate nature of hand movements and poses. Each image needs to be carefully examined, and points and marks must be accurately placed to ensure the quality and reliability of the data. Furthermore, as each image is a two-dimensional representation of a hand, the human expert may be able to accurately identify positional data of each relevant point or mark in two dimensions (e.g., the X and Y coordinates), but accurately determining and specifying the depth (e.g., the Z coordinate) for any given point or mark, is difficult for a human. Consequently, manually generated hand annotations tend to be imprecise, at least in the depth dimension.

Furthermore, to carry out manual hand-related data annotations, a specific lab setup is often employed to capture images that mirror the perspective of an AR device. This setup typically includes camera equipment, lighting conditions, and controlled environments to capture high-quality images of hands in various poses. The goal is to mimic the conditions and perspective in which the hand movements will be tracked and interpreted in AR applications. Therefore, the costs associated with manual hand-related data annotations can be significant. The costs encompass the expenses involved in setting up the lab environment, including camera equipment, lighting, and the necessary software for capturing and managing the images. Additionally, the time and expertise of the skilled personnel manually annotating the images contribute to the overall cost. The intricacy and labor-intensive nature of the process may result in higher expenses due to the time required for manual annotation and the need for highly skilled experts.

In an alternative approach to generating hand-related data annotations, synthetic or computer-generated images of a human hand may be used. This method involves creating virtual hand models and generating a diverse set of synthetic images depicting various hand poses and movements. While this approach offers certain advantages, it is important to note that the resulting synthetic images may not always appear realistic or natural to the human eye.

The use of synthetic images allows for a wider range of hand poses and movements to be depicted, including those that may be difficult or even impossible to perform in reality. This flexibility provides an opportunity to explore and capture a broader spectrum of hand-related data, enabling the training and testing of algorithms with an extensive dataset. However, the inherent limitation of this approach lies in the potential lack of realism in the synthetic images. While efforts are made to create visually accurate representations, there may still be instances where the synthetic hand images do not fully replicate the intricate details, texture, or subtle nuances of real human hands. Consequently, certain aspects of the synthetic hand movements might not precisely align with the natural movements of human hands.

To address these problems and others, a new approach is presented. Consistent with some examples, an augmented reality (AR) device is designed to generate hand annotations for an image that depicts a user's hand in a hand pose associated with a hand gesture. The AR device is equipped with one or more displays, a processor, two or more image sensors, and a memory that stores instructions. These instructions, when executed by the processor, enable the AR device to perform a series of operations.

The first operation involves performing a calibration to generate a 3-D data model of the user's hand. This 3-D data model is derived based on observations and measurements relating to the user's hand. In some examples, the measurements are obtained by analyzing images captured by the image sensors of the AR device as the user wearing the AR device mimics or replicates a hand gesture that is presented, in AR via the display, by an animation of a 3-D virtual representation of a hand performing the hand gesture. For example, as the animated hand gesture is presented in AR via the 3-D virtual representation of a hand, the user wearing the AR device is prompted to position and move his or her hand so as to mimic or replication the motion of the 3-D virtual hand.

Consistent with some examples, the 3-D model of the user's hand is a skeleton-based hand mesh representation, derived from 2-D images or landmark data. The process of modeling the hand involves creating a hand skeleton model that represents the hierarchical structure of the hand. The hand skeleton model consists of nodes or vertices, representing the major hand joints, such as the wrist, knuckles, and finger tips. The edges connecting the vertices represent the bones or phalanges of the fingers. Given an image depicting a hand, the image is analyzed to obtain the 3-D positional data of the landmarks (e.g., the hand joints) and their orientation in 3-D space. This data can be obtained through techniques such as 3-D pose estimation algorithms. Once the 3-D positional data and rotations of all the joints are available, a fixed number of mesh vertices ca be computed to represent the hand. In any specific implementation, the number of vertices may vary based on the complexity and level of detail required for the particular application.

Next, the 3-D data model of the user's hand is used to generate one or more 3-D virtual representations of a hand in a hand pose that corresponds with a hand gesture. Accordingly, various virtual representations of a hand may be generated where each one depicts a hand in a hand pose that corresponds with a hand gesture. Then, a 3-D virtual representation of a hand in a hand pose corresponding to a hand gesture is selected and presented in AR via the display of the AR device. While this 3-D virtual representation of a hand is being presented, the user wearing the AR device is prompted to replicate or mimic the hand pose depicted by the 3-D virtual representation of the hand that is displayed in AR space. Because the 3-D virtual representation of the hand has been generated, in part, based on the 3-D data model of the user's hand, as generated during the calibration operation, the user's hand should closely match the size of the 3-D virtual representation of the hand as presented in AR space.

While the user is replicating the hand pose depicted by the virtual hand, the user may invoke or trigger an image sensor of the AR device to capture an image of the user's hand. Accordingly, upon detecting a triggering event (e.g., a button press, or an audible or spoken command), the AR device invokes at least one image sensor to capture an image of the user's hand positioned and oriented to correspond with the hand pose depicted by the 3-D virtual representation of the hand displayed in AR space.

Finally, the AR device stores the captured image of the user's hand along with corresponding hand annotations that are based on the 3-D data model of the user's hand, as positioned to correspond with the hand pose. Consistent with some examples, before associating the positional data of the relevant landmarks of the hand with the capture image of the hand, an optional mesh fitting operation may be performed to adjust the 3-D positional data of one or more landmarks, based on a comparison of the captured image of the hand and the 3-D virtual representation of a hand.

This innovative AR device and technique provide a unique way to generate and store hand annotations for images depicting a user's hand, using a combination of 3-D modeling, virtual representation of hands, and image capture. In contrast with prior techniques, the technique described herein allows for efficiently generating large amounts of training data—for example, images of hands with corresponding hand annotations—spontaneously, with minimal pre-planning and preparations, and having a diversity of characteristics (e.g., size, color, shape) stemming from natural differences in the hands of the user's who provide the images. The technique can be performed easily by a single person, without the need for human experts to manually annotate images. Moreover, the resulting images are real-world images that realistically display actual hands in various hand poses. Obtaining images of hands for use as training data using the same AR device that will use the trained machine learning models allows for better compatibility and performance optimization. The AR device captures images under similar conditions, ensuring that the training data closely resembles the real-world scenarios in which the trained models will be deployed, leading to improved accuracy and reliability in operations like hand tracking. Other aspects and advantages of the present invention are presented below in connection with the description of the various figures that follows.

FIG. 1 is a flow diagram illustrating an example of method operations involved in a method 100 or technique for using an augmented reality (AR) device, such as AR glasses 101, to generate images of a hand in a hand pose, where each image is associated with corresponding hand-related data annotations, consistent with some examples. As shown in FIG. 1, the first operation 102 is a calibration operation. During the calibration operation, one or more pre-trained computer vision algorithms are provided, as input, images of a user's hand, from which the algorithms generate a 3-D model of the user's hand.

FIG. 2 is a diagram illustrating one example of a calibration operation. Consistent with this example, during the calibration operation, a user wearing the AR device 101 is presented an animation 202 of a virtual hand. Specifically, the animation depicts a 3-D virtual representation of a hand performing a hand gesture in AR space. For example, the virtual hand may be fixed in AR space, such that the user wearing the AR device can move around in physical space to observe the virtual hand from different angles and perspectives. A rendering engine of the AR device will render a view of the virtual hand that is appropriate for the position of the user. The animated virtual hand is presented performing a specific hand gesture and serves as a visual reference for the user, guiding them to position and move their own hand to match the hand gesture being performed by the virtual hand.

As shown in FIG. 2, the example AR views with reference numbers 204-A, 204-B and 204-C represent three individual frames of the animation, showing the virtual hand in three different hand poses as the virtual hand is repeatedly performing the hand gesture. Similarly, the example AR views with reference numbers 206-A, 206-B and 206-C represent the same three frames of the animation, showing the user attempting to use his or her own hand to replication the movement of the virtual hand.

To capture the user's hand movements accurately, the AR device prompts the user to position and move his or her hand in correspondence with the 3-D virtual hand. While the animation is being presented, one or more images of the user's hand are captured using the AR device's image sensor(s). These images serve as input to a pre-trained hand pose estimation model, which employs computer vision techniques to observe measurements. By utilizing the captured images as input to the hand pose estimation model, the AR device achieves highly accurate and real-time tracking of the user's hand in 3-D space. The hand pose estimation model leverages its pre-trained knowledge to interpret the input images and reconstruct a detailed 3-D model of the user's hand, capturing the position, orientation, and articulation of the hand with precision. As previously suggested, with some examples, the 3-D model of the hand of the user is a skeleton-based hand mesh representation having a fixed number of mesh vertices that are computed from 3-D location and rotation data for all joints of the hand of the user, as depicted in images. Note, in some examples, for data privacy purposes, captured images depicting a user's hand are not persistently stored or uploaded to a server, but only used during a single user session.

In some examples, the specific hand gesture performed by the virtual hand may be purposefully selected to enhance the performance of the 3-D modeling of the user's hand. Specifically, the specific hand gesture may be selected so that when the user is replicating the hand gesture, the various landmarks of interest are readily observable by the AR device—that is, the images that are captured via the image sensor(s) of the AR device will show the landmarks and enable the hand pose estimation model to accurately generate measurements for various portions of the user's hand.

Referring again to FIG. 1, after the calibration operation has completed and a 3-D data model of the user's hand has been generated, at operation 104 the 3-D data model of the user's hand is used as an input to a process for generating a 3-D virtual representation of a hand in a hand pose corresponding with a particular hand gesture. This process of generating the 3-D virtual representation of a hand in a hand pose associated with a particular hand gesture may involve kinematic modeling and retargeting techniques from animation files.

Figure 3:
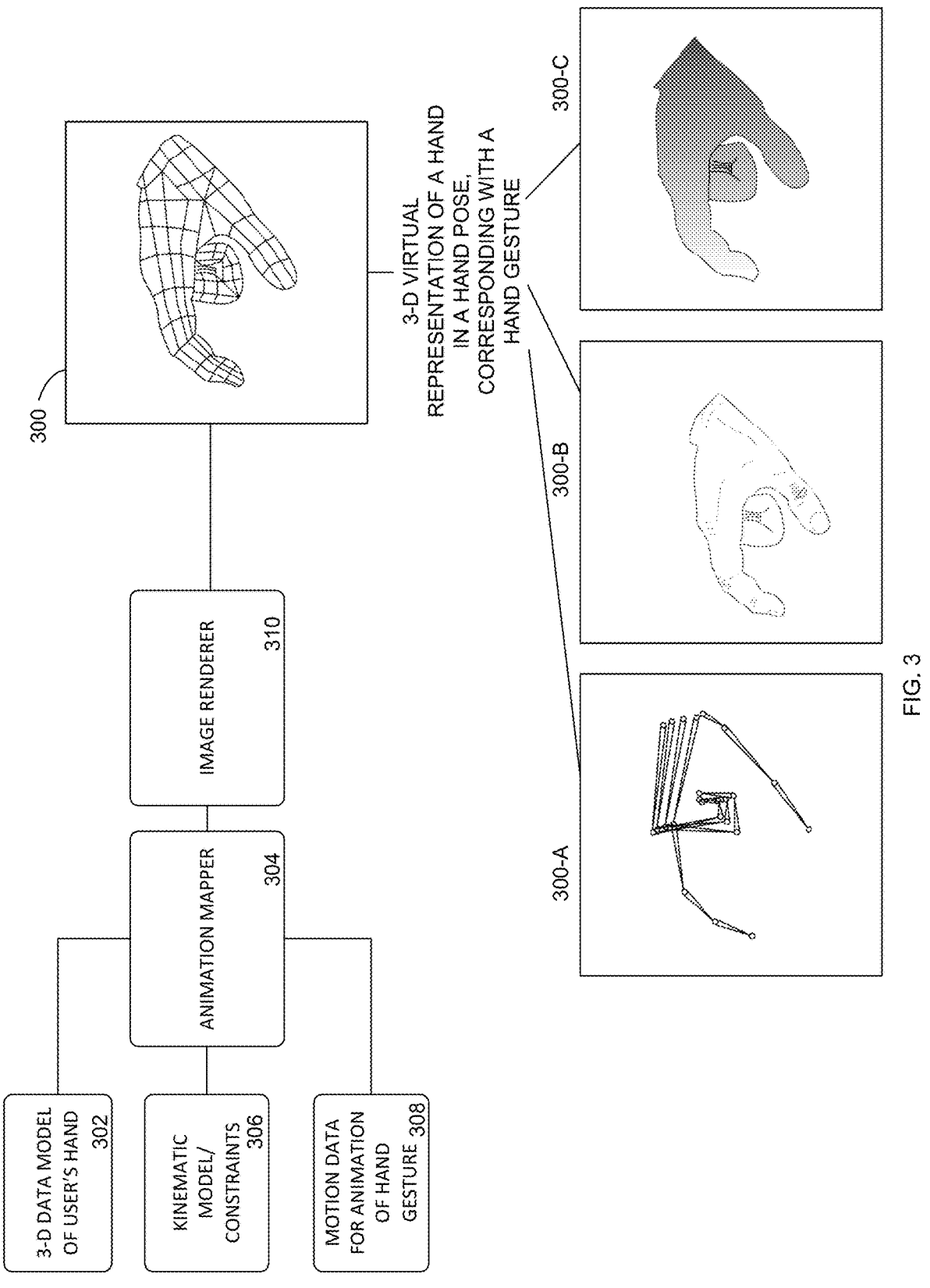
FIG. 3 is a diagram illustrating an example of a technique for generating a 3-D virtual representation of a hand in a hand pose that is associated with a hand gesture, where the virtual representation of the hand is generated to be of a size that corresponds with a 3-D model of the hand of the user, according to some examples.

Referring to FIG. 3, an example of a technique for generating a 3-D virtual representation of a hand 300 in a hand pose that is associated with a specific hand gesture is illustrated. In this example, the 3-D virtual representation of the hand 300 is generated to be of a size that corresponds with the actual size of the user's hand, using as an input the 3-D model of the hand of the user 302. The 3-D data model 302 of the user's hand serves as the foundation for accurately representing the hand's structure and proportions.

Consistent with some examples, an animation mapper 304 is used to generate the 3-D virtual representation of the hand 300 in a specific hand pose associated with a particular hand gesture. The animation mapper 304 may achieve this by utilizing inputs such as the 3-D data model of the user's hand 302, a kinematic model 306 or kinematic constraints, and motion data 308 from an animation file. For example, the animation mapper 304 receives the 3-D data model 302 of the user's hand, which provides the underlying structure and geometry of the hand. The animation mapper 304 may also receive as input a kinematic model or kinematic constraints 306, which define the allowable range of motion and joint behaviors for the hand. The animation mapper 304 receives motion data 308 from an animation file, which contains a pre-captured hand gesture and movement. This motion data typically includes information about joint angles, positions, and orientations at different points in time. The animation mapper 304 performs the mapping process by establishing a correspondence between the joints or bones in the motion data 308 of the animation file and the joints in the 3-D data model 302 of the user's hand. The animation mapper 304 associates each joint in the motion data 308 of the animation file with its corresponding joint in the user's hand model 302, considering differences in joint hierarchies and naming conventions. The animation mapper 304 takes into account the kinematic model 306 or kinematic constraints to ensure that the generated hand pose adheres to the specified range of motion and realistic joint behaviors. It applies the motion data 308 from the animation file while respecting these constraints, ensuring the hand pose of the 3-D virtual hand 300 is physically plausible.

Using the mapped motion data and considering the kinematic constraints 306, the animation mapper 304 applies the motion data 308 to the hand model 302. The joint angles, positions, and orientations of the hand model 302 are adjusted based on the motion data 308, effectively recreating a captured hand gesture in the virtual representation 300. By combining the modified joint parameters, the animation mapper 304 generates a virtual representation of the user's hand in a hand pose associated with the particular hand gesture of the animation. The resulting virtual hand pose closely matches the motions and positions depicted in the animation file, creating a realistic and synchronized virtual hand representation.

The image renderer 310 takes the modified hand model, which incorporates the motion data 308 from the animation mapper 304 and renders images for the 3-D virtual representation of the hand 300. The image renderer 310 may apply various techniques, such as shading, lighting, texture mapping, and surface deformation to create a preferred representation of the virtual hand. The animation mapper 304 and the image renderer work in tandem to ensure that the generated 3-D virtual representation of the hand in the hand pose is not only accurately aligned with the pose as expressed by the motion data 308 but also visually convincing. In various examples, the image renderer 310 may generate different versions or different visual representations of the 3-D virtual hand pose. For example, the virtual hand may be rendered as a synthetic hand mesh 300, a skeletal model 300-A, a virtual but realistic representation 300-B, or a semi-transparent representation 300-C.

The process conveyed in FIG. 3 may be repeated a number of times with different hand gestures, resulting in a variety of different virtual hands in different hand poses, where some of the different hand poses may be associated with different hand gestures. Accordingly, in some examples, a user may be prompted to replicate or mimic any number of different hand poses.

Figure 4:
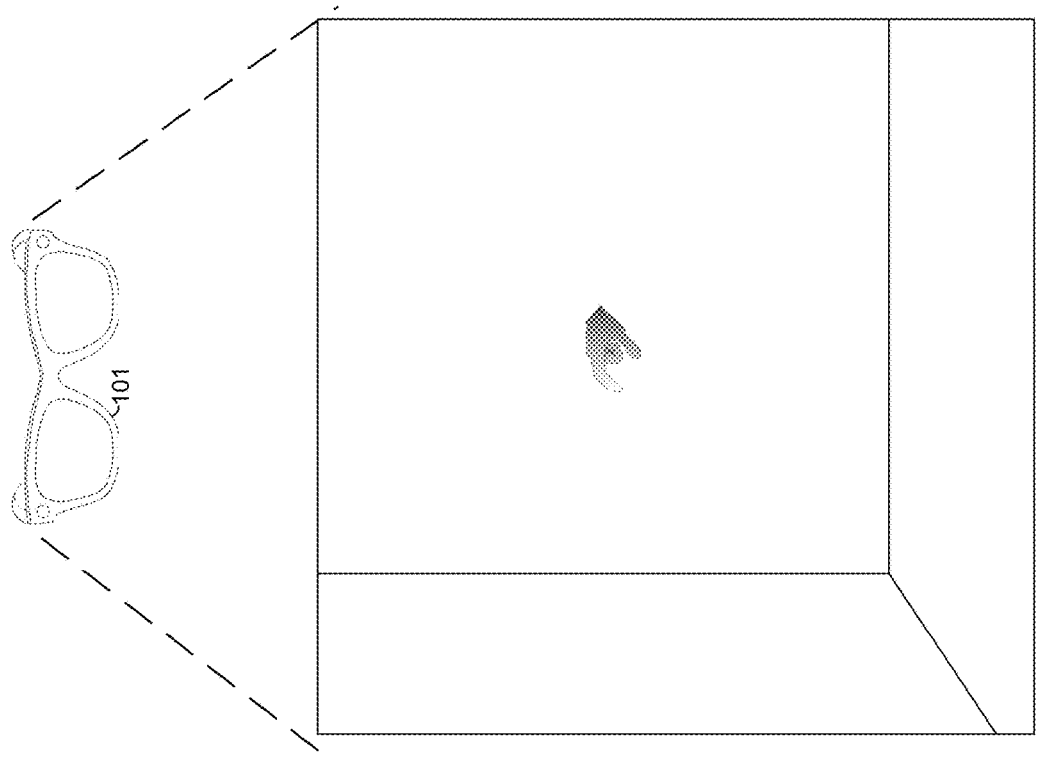
FIG. 4 is a user interface diagram showing an example of a 3-D virtual representation of a hand in a hand pose associated with a hand gesture, as presented in AR space, according to some examples.

Referring again to FIG. 1, after the 3-D virtual representation of the hand in the hand pose has been generated, at method operation 106 the 3-D virtual hand is presented via the display of the AR device to the user wearing the AR device. The virtual hand may be presented as fixed in AR space, such that the user wearing the AR device can move around the physical space, and as the user moves, the view of the virtual hand is updated to reflect the viewing angle and perspective of the user's location. An example of a 3-D virtual representation of a hand in a hand pose associated with a hand gesture is presented in FIG. 4.

While the virtual hand is being presented to the user in AR space, the user is prompted to move and position his or her actual hand to mirror or replicate the hand pose of the virtual hand. This action is somewhat analogous to the user attempting to fit a glove on his or her hand, only in this instance, the user is attempting to "fit" his or her hand to a virtual hand displayed in AR. An example of an AR view showing a user attempting to replicate a hand pose of a virtual hand is presented in FIG. 5.

Figure 5:
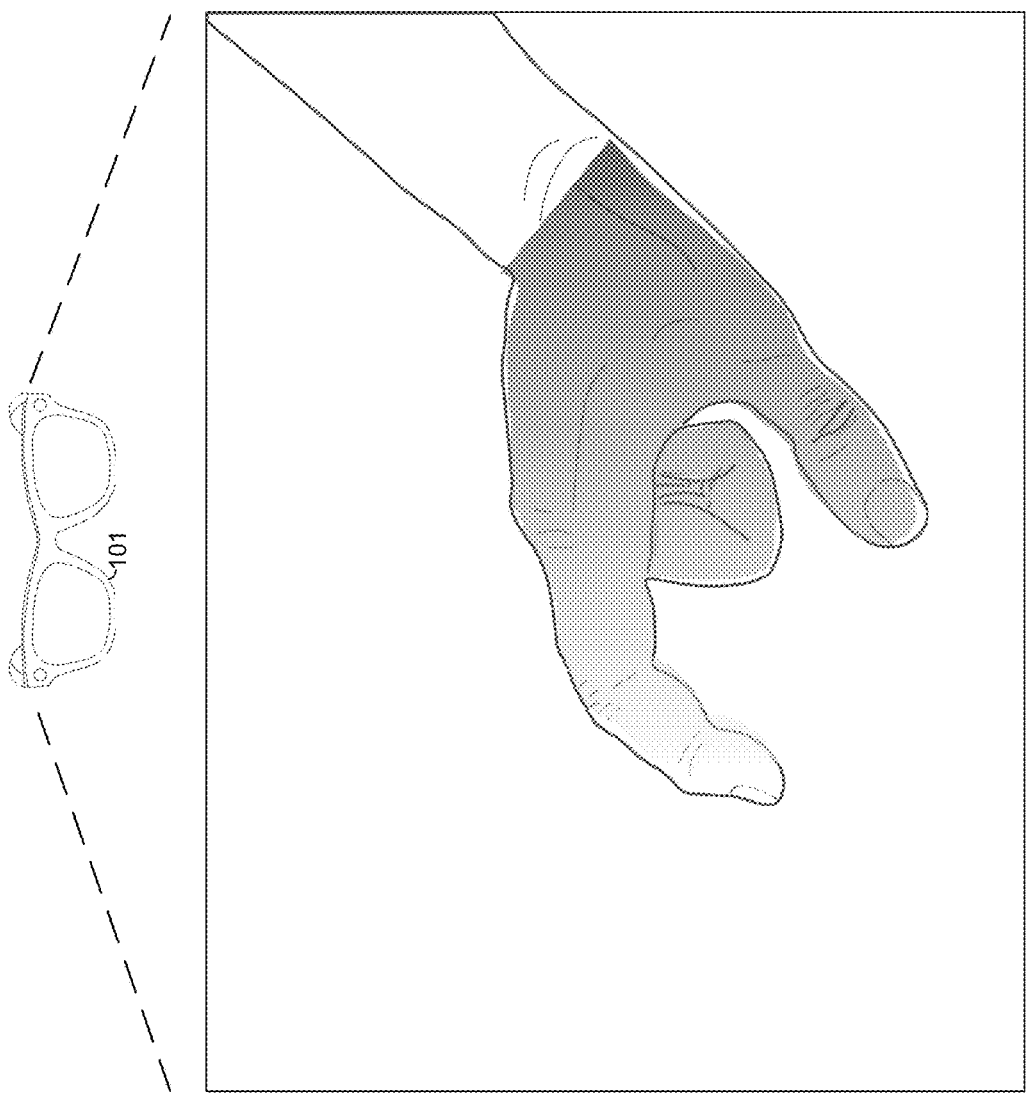
FIG. 5 is a user interface diagram showing a user attempting to replicate a hand pose with his or her hand, where the hand pose is presented by the 3-D virtual representation of the hand presented in AR space, according to some examples.

Referring again to FIG. 1, once the user has managed to move and position his or her hand to replicate the hand pose of the virtual hand (e.g., as depicted in FIG. 5), the user then invokes an image sensor of the AR device 101 to capture an image of his or her hand replicating the hand pose of the virtual hand. Accordingly, at method operation 108, the AR device 101 detects an input resulting from the triggering event. For example, the triggering event may be the user speaking an audible command, making a hand gesture with his or her free hand, or pressing a button (physical or virtual) on the AR device 101 or on another device that has a wired or wireless connection to the AR device, such as a mobile phone or AR controller device.

When the triggering event occurs, at method operation 110 the AR device 101 detects the input (e.g., caused by the triggering event), and in response, activates an image sensor, or multiple image sensors, to capture one or more images of the user's hand in the hand pose.

Figure 6:
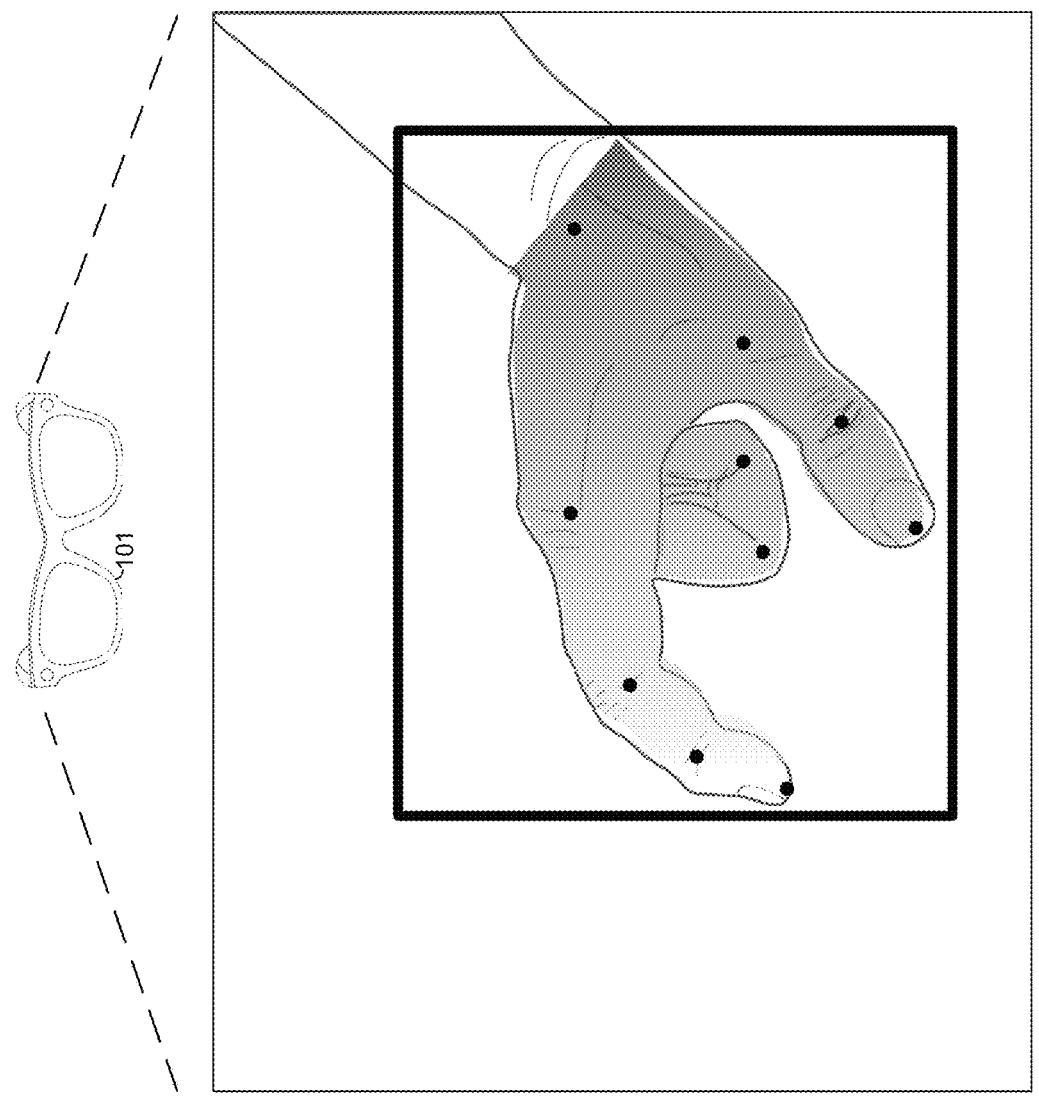
FIG. 6 is a user interface diagram showing two-dimensional (2-D) landmarks mapped to an image of a hand of a user, according to some examples.

At method operation 112, the captured image is stored with the hand-related data annotations that correspond with the hand pose. For example, the hand annotations are the 3-D positional data of the various landmarks that are part of the 3-D model of the user's hand, adjusted to reflect the hand pose based on the motion data of an animation and any kinematic restrictions. Consistent with some examples, prior to saving the image of the hand with the hand annotations, a mesh fitting algorithm may be performed to make refinements and adjustments to the hand annotations, based on analysis of the captured image. FIG. 6 is a user interface diagram showing and example of 2-D landmarks mapped to an image of a hand of a user in a hand pose, according to some examples. Although illustrated in FIG. 6 in two dimensions, in actual practice, each landmark is associated with 3-D positional data (e.g., X, Y and Z coordinate data). Moreover, for purposes of FIG. 6, the occluded landmarks are not presented.

Although not illustrated in FIG. 1, each image of a user's hand in a hand pose that is captured with corresponding hand-related data annotations may be communicated over a network from an AR device to a server, where the data is aggregated with similar images and hand annotations captured by a wide variety of users. Collectively, the data can be used to train machine learning algorithms to perform various tasks.

Consistent with some examples, the method illustrated in FIG. 1 may be implemented as part of a procedure that must be completed by a user in order to access some resource. For example, a user may be prompted to perform a particular hand pose or hand gesture in order to access a particular feature of the AR device. Furthermore, the specific hand poses that are selected to be captured may be new hand poses, associated with new hand gestures, where there is a deficiency of existing training data for use in training a model to detect the new gesture.

Example Augmented Reality (AR) Device

Figure 7:
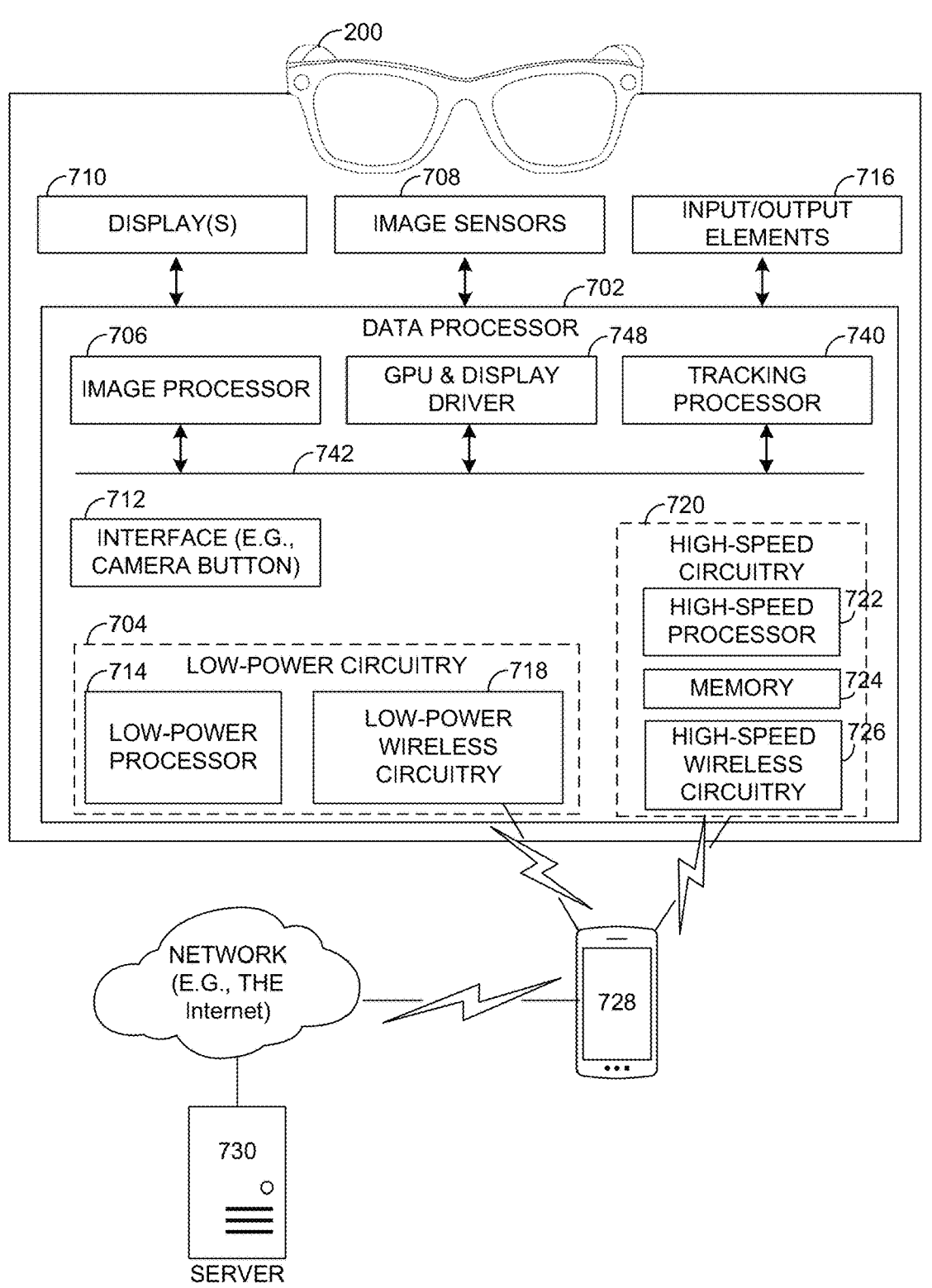
FIG. 7 is a block diagram illustrating an example of the functional components (e.g., hardware components) of an AR device (e.g., AR glasses) with which the methods and techniques described herein, may be implemented, consistent with examples of the present invention.

FIG. 7 is a block diagram illustrating an example of the functional components (e.g., hardware components) of an AR device (e.g., AR glasses 200) with which the methods and techniques described herein, may be implemented, consistent with examples of the present invention. Those skilled in the art will readily appreciate that the AR glasses 200 depicted in FIG. 7 are but one example of the many different devices to which the inventive subject matter may be applicable. For example, embodiments of the present invention are not limited to AR glasses, but are also applicable to AR headsets, and other wearable virtual reality devices and mixed reality devices.

The AR glasses 200 include a data processor 702, a display 710, two or more image sensors 708, and additional input/output elements 716. The input/output elements 716 may include microphones, audio speakers, biometric sensors, additional sensors, or additional display elements integrated with the data processor 702. For example, the input/output elements 716 may include any of I/O components, including motion components, and so forth.

Consistent with one example, and as described herein, the display 710 includes a first sub-display for the user's left eye and a second sub-display for the user's right eye. Accordingly, although referenced in the singular (a display), the display may, in some examples, comprises two separate displays that operate together. Each display of the AR glasses 200 may include a forward optical assembly (not shown) comprising a right projector and a right near eye display, and a forward optical assembly including a left projector and a left near eye display. In some examples, the near eye displays are waveguides. The waveguides include reflective or diffractive structures (e.g., gratings and/or optical elements such as mirrors, lenses, or prisms). Light emitted by the right projector encounters the diffractive structures of the waveguide of the right near eye display, which directs the light towards the right eye of a user to provide an image on or in the right optical element that overlays the view of the real world seen by the user. Similarly, light emitted by a left projector encounters the diffractive structures of the waveguide of the left near eye display, which directs the light towards the left eye of a user to provide an image on or in the left optical element that overlays the view of the real world seen by the user.

The data processor 702 includes an image processor 706 (e.g., a video processor), a graphics processor unit (GPU) & display driver 748, a tracking processor 740, an interface 712, low-power circuitry 704, and high-speed circuitry 720. The components of the data processor 702 are interconnected by a bus 742.

The interface 712 refers to any source of a user command that is provided to the data processor 702 as input. In one or more examples, the interface 712 is a physical button that, when depressed, sends a user input signal from the interface 712 to a low-power processor 714. A depression of such button followed by an immediate release may be processed by the low-power processor 714 as a request to capture a single image, or vice versa. A depression of such a button for a first period of time may be processed by the low-power processor 714 as a request to capture video data while the button is depressed, and to cease video capture when the button is released, with the video captured while the button was depressed stored as a single video file. Alternatively, depression of a button for an extended period of time may capture a still image. In some examples, the interface 712 may be any mechanical switch or physical interface capable of accepting and detecting user inputs associated with a request for data from the image sensor(s) 708. In other examples, the interface 712 may have a software component, or may be associated with a command received wirelessly from another source, such as from the client device 728.

The image processor 706 includes circuitry to receive signals from the image sensors 708 and process those signals from the image sensors 708 into a format suitable for storage in the memory 724 or for transmission to the client device 728. In one or more examples, the image processor 706 (e.g., video processor) comprises a microprocessor integrated circuit (IC) customized for processing sensor data from the image sensors 708, along with volatile memory used by the microprocessor in operation.

The low-power circuitry 704 includes the low-power processor 714 and the low-power wireless circuitry 718. These elements of the low-power circuitry 704 may be implemented as separate elements or may be implemented on a single IC as part of a system on a single chip. The low-power processor 714 includes logic for managing the other elements of the AR glasses 200. As described above, for example, the low-power processor 714 may accept user input signals from the interface 712. The low-power processor 714 may also be configured to receive input signals or instruction communications from the client device 728 via the low-power wireless connection. The low-power wireless circuitry 718 includes circuit elements for implementing a low-power wireless communication system. Bluetooth™ Smart, also known as Bluetooth™ low energy, is one standard implementation of a low power wireless communication system that may be used to implement the low-power wireless circuitry 718. In other examples, other low power communication systems may be used.

The high-speed circuitry 720 includes a high-speed processor 722, a memory 724, and a high-speed wireless circuitry 726. The high-speed processor 722 may be any processor capable of managing high-speed communications and operation of any general computing system used for the data processor 702. The high-speed processor 722 includes processing resources used for managing high-speed data transfers on the high-speed wireless connection 734 using the high-speed wireless circuitry 726. In some examples, the high-speed processor 722 executes an operating system such as a LINUX operating system or other such operating system. In addition to any other responsibilities, the high-speed processor 722 executing a software architecture for the data processor 702 is used to manage data transfers with the high-speed wireless circuitry 726. In some examples, the high-speed wireless circuitry 726 is configured to implement Institute of Electrical and Electronic Engineers (IEEE) 802.11 communication standards, also referred to herein as Wi-Fi. In other examples, other high-speed communications standards may be implemented by the high-speed wireless circuitry 726.

The memory 724 includes any storage device capable of storing camera data generated by the image sensors 708 and the image processor 706. While the memory 724 is shown as integrated with the high-speed circuitry 720, in other examples, the memory 724 may be an independent stand-alone element of the data processor 402. In some such examples, electrical routing lines may provide a connection through a chip that includes the high-speed processor 722 from image processor 706 or the low-power processor 714 to the memory 724. In other examples, the high-speed processor 722 may manage addressing of the memory 724 such that the low-power processor 714 will boot the high-speed processor 722 any time that a read or write operation involving the memory 724 is desired.

The tracking processor 740 estimates a pose of the AR glasses 200. For example, the tracking processor 740 uses image data and corresponding inertial data from the image sensors 708 and the position components, as well as GPS data, to track a location and determine a pose of the AR glasses 200 relative to a frame of reference (e.g., real-world scene). The tracking module 740 continually gathers and uses updated sensor data describing movements of the AR glasses 200 to determine updated three-dimensional poses of the AR glasses 200 that indicate changes in the relative position and orientation relative to physical objects in the real-world environment. The tracking processor 740 permits visual placement of virtual objects relative to physical objects by the AR glasses 200 within the field of view of the user via the displays 710.

The GPU & display driver 738 may use the pose of the AR glasses 200 to generate frames of virtual content or other content to be presented on the displays 410 when the AR glasses 200 are functioning in a traditional AR mode. In this mode, the GPU & display driver 738 generate updated frames of virtual content based on updated three-dimensional poses of the AR glasses 200, which reflect changes in the position and orientation of the user in relation to physical objects in the user's real-world environment.

One or more functions or operations described herein may also be performed in an application resident on the AR glasses 200 or on the client device 728, or on a remote server 730. Consistent with some examples, the AR glasses 200 may operate in a networked system, which includes the AR glasses 200, the client computing device 728, and a server 730, which may be communicatively coupled via the network. The client device 728 may be a smartphone, tablet, phablet, laptop computer, access point, or any other such device capable of connecting with the AR glasses 200 using a low-power wireless connection and/or a high-speed wireless connection. The client device 728 is connected to the server system 730 via the network. The network may include any combination of wired and wireless connections. The server 730 may be one or more computing devices as part of a service or network computing system.

Software Architecture

Figure 8:
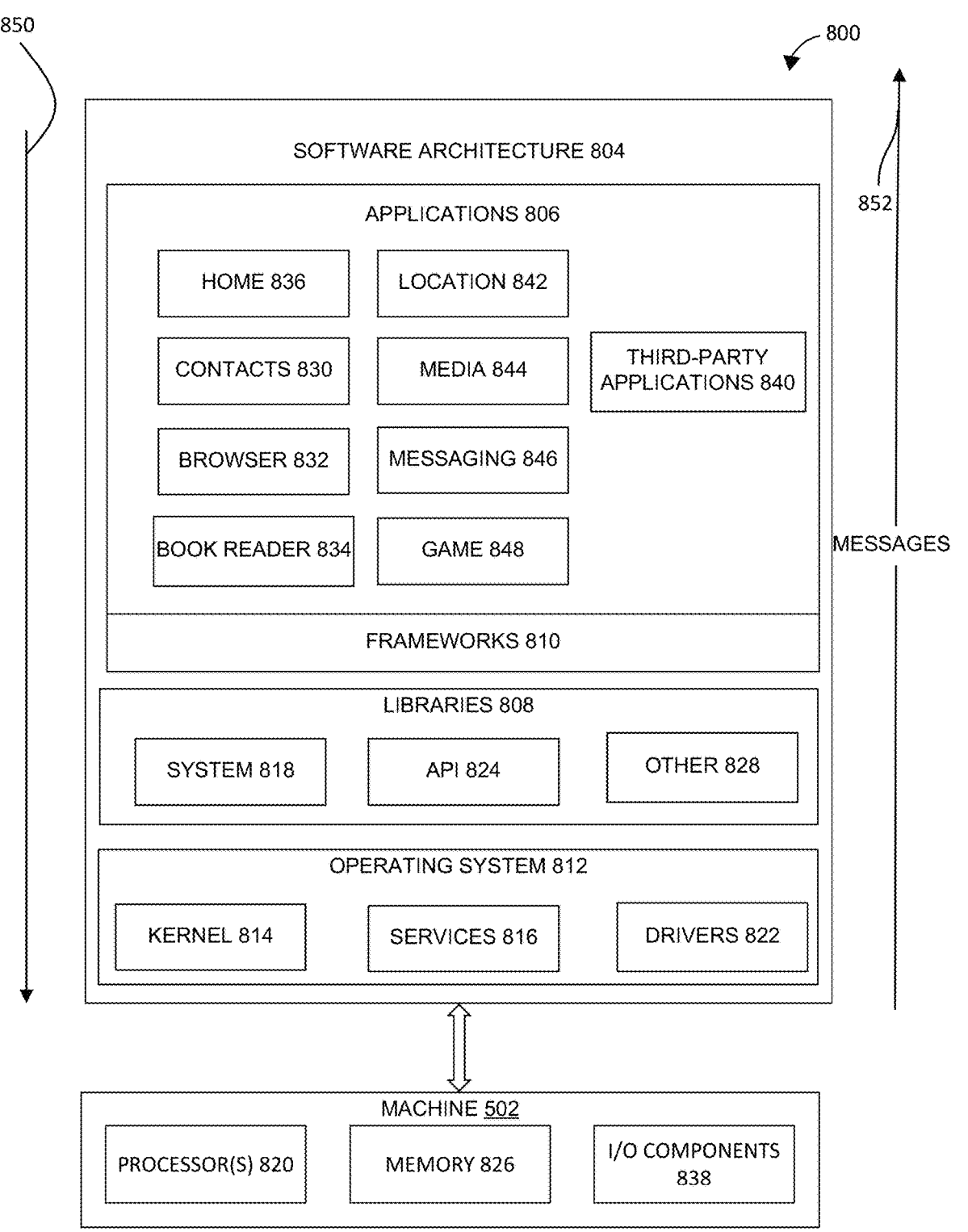
FIG. 8 is a block diagram illustrating a software architecture, which can be installed on any one or more of the devices described herein.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where individual layers provides a particular functionality. The software architecture 804 includes layers such as an operating system 812, libraries 808, frameworks 810, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 522. The kernel 814 acts as an abstraction layer between the hardware and the other software layers. For example, the kernel 814 provides memory management, processor management (e.g., scheduling), component management, networking, and security settings, among other functionalities. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 808 provide a low-level common infrastructure used by the applications 806. The libraries 808 can include system libraries 818 (e.g., C standard library) that provide functions such as memory allocation functions, string manipulation functions, mathematic functions, and the like. In addition, the libraries 808 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement 3D user interfaces), image feature extraction libraries (e.g. OpenIMAJ), database libraries (e.g., SQLite to provide various relational database functions), web libraries (e.g., WebKit to provide web browsing functionality), and the like. The libraries 808 can also include a wide variety of other libraries 828 to provide many other APIs to the applications 806.

The frameworks 810 provide a high-level common infrastructure that is used by the applications 806. For example, the frameworks 810 provide various graphical user interface (GUI) functions, high-level resource management, and high-level location services. The frameworks 810 can provide a broad spectrum of other APIs that can be used by the applications 806, some of which may be specific to a particular operating system or platform.

In an example, the applications 806 may include a home application 836, a contacts application 830, a browser application 832, a book reader application 834, a location application 842, a media application 844, a messaging application 846, a game application 848, and a broad assortment of other Applications such as third-party applications 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party applications 840 (e.g., Applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 840 can invoke the API calls 850 provided by the operating system 812 to facilitate functionality described herein.

EXAMPLES

Example 1 is an augmented reality (AR) device configured to generate hand annotations for an image depicting a hand of a user, the AR device comprising: a display; a processor; two or more image sensors; a memory storing instructions thereon, which, when executed by the processor, cause the AR device to perform operations comprising: performing a calibration operation to generate a three-dimensional data model of the hand of the user based on measurements relating to the hand of the user; generating a three-dimensional virtual representation of a hand in a hand pose corresponding with a hand gesture, based on the three-dimensional data model of the hand of the user; presenting, in AR via the display, the three-dimensional virtual representation of the hand in the hand pose corresponding with the hand gesture; during presentation of the three-dimensional virtual representation of the hand in the hand pose corresponding with the hand gesture in AR, detecting an input; responsive to detecting the input, invoking at least one image sensor to capture an image of the hand of the user positioned to correspond with the three-dimensional virtual representation of the hand in the hand pose corresponding with the hand gesture; and storing the captured image of the hand of the user with corresponding hand annotations based on the three-dimensional data model of the hand of the user.

In Example 2, the subject matter of Example 1 includes, wherein performing the calibration operation to generate a three-dimensional (three-dimensional) data model of the hand of the user based on measurements relating to the hand of the user further comprises: presenting, in AR via the display, an animation of a three-dimensional virtual representation of a hand performing a hand gesture; prompting the user to position and move a hand to correspond with the three-dimensional virtual representation of the hand performing the hand gesture; while the animation of the three-dimensional virtual representation of the hand performing the hand gesture is being presented, capturing one or more images of the hand of the user; and using the one or more images as input to a pre-trained hand pose estimation model to generate the three-dimensional data model of the hand of the user.

In Example 3, the subject matter of Example 2 includes, where the pre-trained hand pose estimation model generates the three-dimensional data model of the hand as a skeleton-based hand mesh representation by computing a fixed number of mesh vertices to represent the hand of the user, based on three-dimensional location and rotation data derived from one or more captured images depicting the hand of the user.

In Example 4, the subject matter of Examples 1-3 includes, wherein the three-dimensional virtual representation of the hand comprises: a synthetic hand mesh; a point cloud; or a skeletal model.

In Example 5, the subject matter of Examples 1-4 includes, wherein generating the three-dimensional virtual representation of the hand in the hand pose corresponding with the hand gesture, based on the three-dimensional data model of the hand of the user, further comprises: mapping motion data of an animation of a hand performing a gesture to corresponding positional data for joints or bones, as represented by the three-dimensional data model of the hand of the user; adjusting joint angles of the three-dimensional data model of the hand according to the motion data of the animation; and rendering a plurality of two-dimensional (two-dimensional) images of the three-dimensional virtual representation of the hand in the hand pose corresponding with the hand gesture, each two-dimensional image in the plurality of two-dimensional images representing a viewpoint of the three-dimensional virtual representation of the hand.

In Example 6, the subject matter of Examples 1-5 includes, wherein presenting, in AR via the display, the three-dimensional virtual representation of the hand in the hand pose corresponding with the hand gesture further comprises; presenting the three-dimensional virtual representation of the hand fixed in AR space, thereby enabling the user to move around in physical space to observe the three-dimensional virtual representation of the hand from different angles and different perspectives.

In Example 7, the subject matter of Examples 1-6 includes, wherein the corresponding hand annotations based on the three-dimensional data model of the hand of the user are hand annotations representing three-dimensional positional data for various points of the three-dimensional data model of the hand of the user, wherein the three-dimensional positional data of each point has been adjusted to reflect the hand pose corresponding with the hand gesture as depicted by the three-dimensional virtual representation of the hand when the image of the hand of the user was captured.

In Example 8, the subject matter of Examples 1-7 includes, wherein the memory is storing additional instructions thereon, which, when executed by the processor, cause the AR device to perform additional operations comprising: prior to storing the captured image of the hand of the user with corresponding hand annotations based on the three-dimensional data model of the hand of the user, performing a mesh fitting operation to improve accuracy of three-dimensional positional data of various points of the three-dimensional data model of the hand, based on analysis of the image of the hand of the user.

In Example 9, the subject matter of Examples 1-8 includes, wherein the detected input results from a triggering event comprising: an audible command; a hand gesture; a press of a button located on the AR device; or a press of a button located on a device communicatively coupled with the AR device.

Example 10 is a computer-implemented method comprising: performing a calibration operation to generate a three-dimensional (three-dimensional) data model of a hand of a user based on measurements relating to the hand of the user; generating a three-dimensional virtual representation of a hand in a hand pose corresponding with a hand gesture, based on the three-dimensional data model of the hand of the user; presenting, in AR via a display, the three-dimensional virtual representation of the hand in the hand pose corresponding with the hand gesture; during presentation of the three-dimensional virtual representation of the hand in the hand pose corresponding with the hand gesture in AR, detecting an input; responsive to detecting the input, invoking at least one image sensor to capture an image of the hand of the user positioned to correspond with the three-dimensional virtual representation of the hand in the hand pose corresponding with the hand gesture; and storing the captured image of the hand of the user with corresponding hand annotations based on the three-dimensional data model of the hand of the user.

In Example 11, the subject matter of Example 10 includes, wherein performing the calibration operation to generate a three-dimensional (three-dimensional) data model of the hand of the user based on measurements relating to the hand of the user further comprises: presenting, in AR via the display, an animation of a three-dimensional virtual representation of a hand performing a hand gesture; prompting the user to position and move a hand to correspond with the three-dimensional virtual representation of the hand performing the hand gesture; while the animation of the three-dimensional virtual representation of the hand performing the hand gesture is being presented, capturing one or more images of the hand of the user; and using the one or more images as input to a pre-trained hand pose estimation model to generate the three-dimensional data model of the hand of the user.

In Example 12, the subject matter of Example 11 includes, where the pre-trained hand pose estimation model generates the three-dimensional data model of the hand as a skeleton-based hand mesh representation by computing a fixed number of mesh vertices to represent the hand of the user, based on three-dimensional location and rotation data derived from one or more captured images depicting the hand of the user.

In Example 13, the subject matter of Examples 10-12 includes, wherein the three-dimensional virtual representation of the hand comprises: a synthetic hand mesh; a point cloud; or a skeletal model.

In Example 14, the subject matter of Examples 10-13 includes, wherein generating the three-dimensional virtual representation of the hand in the hand pose corresponding with the hand gesture, based on the three-dimensional data model of the hand of the user, further comprises: mapping motion data of an animation of a hand performing a gesture to corresponding positional data for joints or bones, as represented by the three-dimensional data model of the hand of the user; adjusting joint angles of the three-dimensional data model of the hand according to the motion data of the animation; and rendering a plurality of two-dimensional (two-dimensional) images of the three-dimensional virtual representation of the hand in the hand pose corresponding with the hand gesture, each two-dimensional image in the plurality of two-dimensional images representing a viewpoint of the three-dimensional virtual representation of the hand.

In Example 15, the subject matter of Examples 10-14 includes, wherein presenting, in AR via the display, the three-dimensional virtual representation of the hand in the hand pose corresponding with the hand gesture further comprises; presenting the three-dimensional virtual representation of the hand fixed in AR space, thereby enabling the user to move around in physical space to observe the three-dimensional virtual representation of the hand from different angles and different perspectives.

In Example 16, the subject matter of Examples 10-15 includes, wherein the corresponding hand annotations based on the three-dimensional data model of the hand of the user are hand annotations representing three-dimensional positional data for various points of the three-dimensional data model of the hand of the user, wherein the three-dimensional positional data of each point has been adjusted to reflect the hand pose corresponding with the hand gesture as depicted by the three-dimensional virtual representation of the hand when the image of the hand of the user was captured.

In Example 17, the subject matter of Examples 10-16 includes, prior to storing the captured image of the hand of the user with corresponding hand annotations based on the three-dimensional data model of the hand of the user, performing a mesh fitting operation to improve accuracy of three-dimensional positional data of various points of the three-dimensional data model of the hand, based on analysis of the image of the hand of the user.

In Example 18, the subject matter of Examples 10-17 includes, wherein the detected input results from a triggering event comprising: an audible command; a hand gesture; a press of a button located on the AR device; or a press of a button located on a device communicatively coupled with the AR device.

Example 19 is an AR device configured to generate hand annotations for an image depicting a hand of a user, the AR device comprising: means for performing a calibration operation to generate a three-dimensional data model of the hand of the user based on measurements relating to the hand of the user; means for generating a three-dimensional virtual representation of a hand in a hand pose corresponding with a hand gesture, based on the three-dimensional data model of the hand of the user; means for presenting, in AR via the display, the three-dimensional virtual representation of the hand in the hand pose corresponding with the hand gesture; during presentation of the three-dimensional virtual representation of the hand in the hand pose corresponding with the hand gesture in AR, means for detecting an input; responsive to detecting the input, means for invoking at least one image sensor to capture an image of the hand of the user positioned to correspond with the three-dimensional virtual representation of the hand in the hand pose corresponding with the hand gesture; and means for storing the captured image of the hand of the user with corresponding hand annotations based on the three-dimensional data model of the hand of the user.

In Example 20, the subject matter of Example 19 includes, wherein performing the calibration operation to generate the three-dimensional data model of the hand of the user based on measurements relating to the hand of the user further comprises: presenting, in AR via the display, an animation of a three-dimensional virtual representation of a hand performing a hand gesture; prompting the user to position and move a hand to correspond with the three-dimensional virtual representation of the hand performing the hand gesture; while the animation of the three-dimensional virtual representation of the hand performing the hand gesture is being presented, capturing one or more images of the hand of the user; and using the one or more images as input to a pre-trained hand pose estimation model to generate the three-dimensional data model of the hand of the user.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components, also referred to as "computer-implemented." Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. An augmented reality (AR) device configured to generate hand annotations for an image depicting a hand of a user, the AR device comprising:

a display;

a processor;

two or more image sensors;

a memory storing instructions thereon, which, when executed by the processor, cause the AR device to perform operations comprising:

performing a calibration operation to generate a three-dimensional (3-D) data model of the hand of the user based on measurements relating to the hand of the user, the calibration operation comprising:

presenting, in AR via the display, an animated hand gesture;

prompting the user to position and move a hand to correspond with the animated hand gesture;

while the animated hand gesture is being presented, capturing one or more images of the hand of the user; and using the one or more images as input to a pre-trained hand pose estimation model to generate the 3-D data model of the hand of the user;

generating, based on the 3-D model of the hand of the user, a 3-D virtual representation of a hand in a hand pose corresponding with a hand gesture different from the animated hand gesture;

presenting, in AR via the display, the 3-D virtual representation of the hand in the hand pose corresponding with the hand gesture;

during presentation of the 3-D virtual representation of the hand in the hand pose corresponding with the hand gesture in AR, detecting an input;

responsive to detecting the input, invoking at least one image sensor to capture an image of the hand of the user positioned to correspond with the 3-D virtual representation of the hand in the hand pose corresponding with the hand gesture; and storing the captured image of the hand of the user with corresponding hand annotations based on the 3-D data model of the hand of the user.

2. The AR device of claim 1, where the pre-trained hand pose estimation model generates the 3-D data model of the hand as a skeleton-based hand mesh representation by computing a fixed number of mesh vertices to represent the hand of the user, based on 3-D location and rotation data derived from one or more captured images depicting the hand of the user.

3. The AR device of claim 1, wherein the 3-D virtual representation of the hand comprises:

a synthetic hand mesh;

21 a point cloud; or a skeletal model.

4. The AR device of claim 1, wherein generating the 3-D virtual representation of the hand in the hand pose corresponding with the hand gesture, based on the 3-D data model of the hand of the user, further comprises:

mapping motion data of an animation of a hand performing a gesture to corresponding positional data for joints or bones, as represented by the 3-D data model of the hand of the user;

adjusting joint angles of the 3-D data model of the hand according to the motion data of the animation; and rendering a plurality of two-dimensional (2-D) images of the 3-D virtual representation of the hand in the hand pose corresponding with the hand gesture, each 2-D image in the plurality of 2-D images representing a viewpoint of the 3-D virtual representation of the hand.

5. The AR device of claim 1, wherein presenting, in AR via the display, the 3-D virtual representation of the hand in the hand pose corresponding with the hand gesture further comprises;

presenting the 3-D virtual representation of the hand fixed in AR space, thereby enabling the user to move around in physical space to observe the 3-D virtual representation of the hand from different angles and different perspectives.

6. The AR device of claim 1, wherein the corresponding hand annotations based on the 3-D data model of the hand of the user are hand annotations representing 3-D positional data for various points of the 3-D data model of the hand of the user, wherein the 3-D positional data of each point has been adjusted to reflect the hand pose corresponding with the hand gesture as depicted by the 3-D virtual representation of the hand when the image of the hand of the user was captured.

7. The AR device of claim 1, wherein the memory is storing additional instructions thereon, which, when executed by the processor, cause the AR device to perform additional operations comprising:

prior to storing the captured image of the hand of the user with corresponding hand annotations based on the 3-D data model of the hand of the user, performing a mesh fitting operation to improve accuracy of 3-D positional data of various points of the 3-D data model of the hand, based on analysis of the image of the hand of the user.

8. The AR device of claim 1, wherein the detected input results from a triggering event comprising:

an audible command;

a hand gesture;

a press of a button located on the AR device; or a press of a button located on a device communicatively coupled with the AR device.

9. The AR device of claim 1, wherein generating the 3-D virtual representation of a hand in the hand pose corresponding with the hand gesture comprises:

selecting motion data for a particular hand gesture from a library of animation files, each animation file in the library containing pre-captured motion data for a different hand gesture; and using the selected motion data to generate the 3-D virtual representation of the hand in the hand pose corresponding with the particular hand gesture.

10. A computer-implemented method comprising:

performing a calibration operation to generate a three-dimensional (3-D) data model of a hand of a user based on measurements relating to the hand of the user, the calibration operation comprising:

presenting in AR via a display, an animated hand gesture;

prompting the user to position and move a hand to correspond with the animated hand gesture;

while the animated hand gesture is being presented, capturing one or more images of the hand of the user; and using the one or more images as input to a pre-trained hand pose estimation model to generate the 3-D data model of the hand of the user;

generating, based on the 3-D model of the hand of the user, a 3-D virtual representation of a hand in a hand pose corresponding with a hand gesture different from the animated hand gesture;

presenting, in AR via a display, the 3-D virtual representation of the hand in the hand pose corresponding with the hand gesture;

during presentation of the 3-D virtual representation of the hand in the hand pose corresponding with the hand gesture in AR, detecting an input;

responsive to detecting the input, invoking at least one image sensor to capture an image of the hand of the user positioned to correspond with the 3-D virtual representation of the hand in the hand pose corresponding with the hand gesture; and storing the captured image of the hand of the user with corresponding hand annotations based on the 3-D data model of the hand of the user.

11. The computer-implemented method of claim 10, where the pre-trained hand pose estimation model generates the 3-D data model of the hand as a skeleton-based hand mesh representation by computing a fixed number of mesh vertices to represent the hand of the user, based on 3-D location and rotation data derived from one or more captured images depicting the hand of the user.

12. The computer-implemented method of claim 10, wherein the 3-D virtual representation of the hand comprises:

a synthetic hand mesh;

a point cloud; or a skeletal model.

13. The computer-implemented method of claim 10, wherein generating the 3-D virtual representation of the hand in the hand pose corresponding with the hand gesture, based on the 3-D data model of the hand of the user, further comprises:

mapping motion data of an animation of a hand performing a gesture to corresponding positional data for joints or bones, as represented by the 3-D data model of the hand of the user;

adjusting joint angles of the 3-D data model of the hand according to the motion data of the animation; and rendering a plurality of two-dimensional (2-D) images of the 3-D virtual representation of the hand in the hand pose corresponding with the hand gesture, each 2-D image in the plurality of 2-D images representing a viewpoint of the 3-D virtual representation of the hand.

14. The computer-implemented method of claim 10, wherein presenting, in AR via the display, the 3-D virtual representation of the hand in the hand pose corresponding with the hand gesture further comprises;

presenting the 3-D virtual representation of the hand fixed in AR space, thereby enabling the user to move around in physical space to observe the 3-D virtual representation of the hand from different angles and different perspectives.

15. The computer-implemented method of claim 10, wherein the corresponding hand annotations based on the 3-D data model of the hand of the user are hand annotations representing 3-D positional data for various points of the 3-D data model of the hand of the user, wherein the 3-D positional data of each point has been adjusted to reflect the hand pose corresponding with the hand gesture as depicted by the 3-D virtual representation of the hand when the image of the hand of the user was captured.

16. The computer-implemented method of claim 10, further comprising:

prior to storing the captured image of the hand of the user with corresponding hand annotations based on the 3-D data model of the hand of the user, performing a mesh fitting operation to improve accuracy of 3-D positional data of various points of the 3-D data model of the hand, based on analysis of the image of the hand of the user.

17. The computer-implemented method of claim 10, wherein the detected input results from a triggering event comprising:

an audible command;

a hand gesture;

a press of a button located on an AR device; or a press of a button located on a device communicatively coupled with the AR device.

18. The computer-implemented method of claim 10, wherein generating the 3-D virtual representation of a hand in the hand pose corresponding with the hand gesture comprises:

selecting motion data for a particular hand gesture from a library of animation files, each animation file in the library containing pre-captured motion data for a different hand gesture; and using the selected motion data to generate the 3-D virtual representation of the hand in the hand pose corresponding with the particular hand gesture.

19. An AR device configured to generate hand annotations for an image depicting a hand of a user, the AR device comprising:

means for performing a calibration operation to generate a 3-D data model of the hand of the user based on measurements relating to the hand of the user, the calibration operation comprising:

presenting, in AR via a display, an animated hand gesture;

prompting the user to position and move a hand to correspond with the animated hand gesture;

while the animated hand gesture is being presented, capturing one or more images of the hand of the user; and using the one or more images as input to a pre-trained hand pose estimation model to generate the 3-D data model of the hand of the user;

means for generating, based on the 3-D model of the hand of the user, a 3-D virtual representation of a hand in a hand pose corresponding with a hand gesture different from the animated hand gesture;

means for presenting, in AR, the 3-D virtual representation of the hand in the hand pose corresponding with the hand gesture;

during presentation of the 3-D virtual representation of the hand in the hand pose corresponding with the hand gesture in AR, means for detecting an input;

responsive to detecting the input, means for invoking at least one image sensor to capture an image of the hand of the user positioned to correspond with the 3-D virtual representation of the hand in the hand pose corresponding with the hand gesture; and means for storing the captured image of the hand of the user with corresponding hand annotations based on the 3-D data model of the hand of the user.

*     *     *     *     *